3,407,154
ACID AMIDE MODIFIED UREA FORMALDEHYDE ALPHA-CELLULOSE FILLED MOLDING COMPOUND

George Sims Casebolt, Cheshire, and David E. Cordier, Hamden, Conn., assignors to American Cyanamid Company, Stamford, Conn., a corporation of Maine
No Drawing. Filed July 21, 1965, Ser. No. 473,850
6 Claims. (Cl. 260—17.3)

ABSTRACT OF THE DISCLOSURE

A urea formaldehyde molding composition containing from about 1.5 percent to about 10 percent by weight of certain acid amides.

---

The present invention relates to a novel and unique urea-formaldehyde molding composition exhibiting superior molding properties and characterized by the ability to be rapidly molded with comparative ease of molding techniques. In its process aspects the invention further relates to a means for preparing such a composition and its use in molding to form a substantially degassed molded article.

More specifically, our invention is directed toward the manufacture of urea-formaldehyde molding compositions having improved flow or plasticity and reduction of gas evolution. When molded the articles resulting therefrom display a significantly reduced tendency to exhibit gas pockets, gas occlusions, or related defects which detract greatly from the appearance and serviceability of the final product. Such defects are particularly characteristic of present day urea-formaldehyde molding compositions. Still more particularly, our invention conceives and embodies the manufacture and use of urea-formaldehyde molding compositions which flow freely and mold "gas free" on simple molding cycles. By the term "gas free" as employed hereinbelow, we intend to refer to those materials having a drastically reduced evolution of gas during the molding or curing operation.

The new and improved molding materials made in accordance with our invention comprises a mixture of a fusible reactive urea-formaldehyde reaction product usually impregnated into a cellulosic filler, and as a chemical modifier a compound of the general structure:

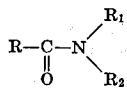

wherein R represents either hydrogen, a lower alkyl group of from about 1 to 5 carbon atoms, or a lower alkenyl group of from about 2 to 5 carbon atoms; $R_1$ and $R_2$ can be either hydrogen, a lower alkyl group of $C_1$–$C_5$ carbon atoms or a lower hydroxyalkyl group containing from about $C_1$–$C_5$ carbon atoms. This chemical additive material which is the key to our discovery is added to the urea-formaldehyde in amounts of from about 1½ to about 10 percent by weight of the total composition. Most preferably, for practical considerations about 2½ to 5 percent by weight of the formamide member of this group is added in present manufacture. Pigments, lubricants, mold release agents, curing agents, etc., may also be present in the composition as required. The resulting molding compositions as supplied commercially are either finely divided or granular powders containing the urea-formaldehyde reaction product, filler, modifier and other additives in a visually homogenous mix.

Urea formaldehyde plastics have many outstanding characteristics, which make them highly useful in a wide variety of applications. They can be produced in a broad range of attractive colors and transparencies; they are stable to light and retain their initial color and appearance during use; they are very hard, take a high gloss or polish, and are difficult to mar or scratch; they are resistant to water and extremely resistant to oils, perfumes, and organic solvents; they have good resistance to heat; and their electrical properties are superior, especially resistance to arcing or surface electrical tracking. As a result, they are employed in the molding of numerous products, including bottle caps, wall plates, and other electrical wiring devices, buttons, lighting fixtures, cosmetics and jewelry containers, stove and refrigerator parts, toilet seats, and many types of housings.

In the molding of these parts, the ability to flow uniformly throughout the mold cavity and to fill out intricate sections completely and flawlessly is essential. Unfortunately, urea-formaldehyde molding materials of the prior art have not normally possessed the excellent flow properties exhibited by phenol-formaldehyde molding plastics, and more careful control of molding conditions has been necessary with the products in question. Moreover, the tendency, previously mentioned, for molded urea plastics parts to exhibit gas pockets or occlusions has made their molding much more troublesome. Various techniques have been developed to minimize gas entrapment, including use of preformed or pelleted material instead of loose compound, prewarming the material, use of delayed closing cycles, and "breathing" the mold (opening the press slightly shortly after the initial close to permit escape of volatile products). Although these techniques are beneficial, in many cases they are not completely effective, and in other cases they cannot be used for economic or other reasons, e.g., "breathing" cannot be employed on long draw or complex parts because opening the press would tear the semicured plastic and leave unsightly defects in the final cured molding. Practically, then, the alternative has been to "cure out" the gas by leaving the part under pressure in the mold for such a time as is necessary to produce an acceptable appearance, i.e., without objectionable gas deposits. The time under pressure to produce a gas-free appearance ordinarily is very much longer than the time required simply to cure the plastic to the point where it will retain its shape and be useful for its intended purpose. The incremental cure time to "cure out" the gas may be from one-quarter to one-half the minimum cure time up to several times the minimum cure time, depending on the particular part design and mold construction. It is believed that the mechanism whereby gas is "cured out" by extending the cure time is that the additional cure cross-links the plastic further to the point where its hot strength is adequate to resist the internal pressure of the entrapped gases without being distorted or ruptured internally when the external pressure is released. The net result, it will be appreciated, is to greatly prolong the cure time in the mold, and to greatly increase the expense of molding urea plastics. Even with the use of the best molding techniques, in many cases reject rates, because of gas entrapment, are so high as to make the molding of specific objects in urea plastics commercially impractical.

We have now discovered how to produce modified urea-formaldehyde molding compositions which can be molded free of entrapped gas without resorting to complicated molding cycles or techniques. The tendency for external blistering and gas deposits has been eliminated or greatly reduced in our new compositions, which may be said to have been "degassed." Morover, these improved molding materials exhibit better flow as well as less critical molding properties, and lend themselves readily to fabrication by transfer, plunger and thermosetting injection molding methods in addition to conventional compression molding methods.

Our discovery in its process aspect, preferably embodies the incorporation of about 1½ to 10 percent by weight of the modifier

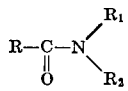

where R, $R_1$ and $R_2$ are as above-identified, into an otherwise conventional cellulose filled urea-formaldehyde molding compositions during the process step wherein reduction to a fine particle size and addition of other ingredients is customarily carried out. This is preferably during the ball milling operation, although it may be added at an earlier stage in the process of manufacture. Typical modifiers useable within the process include the amides and substituted amides formamide, acetamide, propionamide, n-butyramide, isobutyramide, trimethylacetamide, n-valeramide, acrylamide, methacrylamide, N-methyl formamide, N,N-dimethyl formamide, N-methyl acetamide, N,N-dimethyl acetamide, N-t-butyl formamide, N-methylol formamide, N-2-hydroxy ethyl acetamide and the like. Through the incorporation of these amides, substantially gas-free moldings can be obtained at essentially the point of minimum cure, i.e., without having to "cure out" the gas by a prolonged time under pressure in the mold. This valuable advance in molding technique has been achieved without sacrifice of the excellent color, translucency, appearance, hardness, solvent resistance, water resistance or electrical properties characteristic of urea-fromaldehyde resins.

The gases generated during molding and entrapped are believed to be a combination of trapped air, loosely bound formaldehyde, free water vapor, and water vapor produced as a result of the condensation reaction occurring as the resin cross-links to form its cured structure. These gases sealed within the molded article at a temperature in the neighborhood of 270° F. to 320° F. while in the mold, exert a tremendous pressure within the molded article. Under present manufacture, cure must be prolonged to a degree wherein the cross-linked polymer structure of the molded article has sufficient physical strength to overcome this outward gas pressure exerted when the mold is opened, and thereby avoid internal rupture or physical distortion of the molded article. Other than this approach all efforts to date to reduce the generation of said gas have proven unsuccessful.

The instant finding is quite unexpected, in view of the present state of knowledge in the well-developed art of manufacture of urea-formaldehyde resins. While applicants do not know the precise chemical mechanism which causes the unexpected phenomena noted above to take place when the modifier is added to the reaction product prior to cure in the critical quantities specified, it is possible that these compounds may function as latent acids and accelerate the rate of cure. It has also been suggested that the modifier compounds may react chemically with the urea-formaldehyde resin or some constituent thereof (such as loosly bound formaldehyde) to produce a non-gaseous reaction product. Although applicants do not wish to be bound by any speculation as to the mode of action, the observed improvements are also consistent with several physical explanations: (a) the fluidity of the molding composition during the early stages of molding may be so reduced as to permit easy and complete escape of the deleterious gases or vapors during flow or (b) the surface tension or solubility characteristics of the urea-formaldehyde molding composition may be so changed by the modifier as to more completely absorb the gases or vapors which would otherwise be liberated during molding. Whatever the mechanism may be, our invention permits the rapid and simple molding of urea-formaldehyde plastics to produce gas free parts of high quality and appearance.

It is an object of our invention to disclose a novel and improved molding composition comprising principally (a) a major amount of a dry, fusible, reactive urea-formaldehyde reaction product, carried on a cellulose filler (b) a critical quantity of from about 1.5% to about 10% by weight, and preferably about 2.5% to about 5% by weight, of a compound,

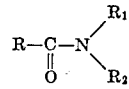

as previously defined, but preferably formamide or acetamide as a "degassing" agent, and (c) other adjuvants such as mold lubricants, curing agents and flow control agents, and pigments, in minor amounts as required. In the practice of our invention, (b) and (c) are incorporated in the cellulose-filled urea-formaldehyde base compound (a) preferably by ball mill grinding, although they can be added at earlier stages if desired. The resulting dry, fluffy fine powder may either be sold in that form, or as is more customary in the industry, may first be converted to a dry granular form ready for molding. Any suitable method of densification and granulation may be employed, with cold densification methods being preferred.

In this invention, hence, a heat-reactive composition is prepared, which composition comprises a dry, fusible, reactive thermosetting reaction product of a resin-forming amino compound and formaldehyde, a cellulose filler, curing catalysts, stabilizers, lubricants and pigments, and as a "degassing" agent, a compound of the formula:

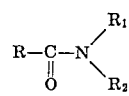

in the critical amounts specified heretofore.

We have found that the precise composition or method of preparing the amino molding compound is not critical to our invention so long as the base formulation is suitable for use as a molding compound. A beneficial effect on flow has been observed in all instances where the modifiers of the invention have been incorporated, regardless of the base material. In the same way, a beneficial "degassing" effect has been observed in all types of urea-formaldehyde molding compositions examined, regardless of composition or method of preparation, provided that an amount of a specified "degassing" agent in the critical range has been employed, and incorporated in the preferred manner.

The quantity of "degassing" agent is critical. We have discovered that as little as 1.5% by weight of a modifier such as formamide, based on the total weight of the urea-formaldehyde molding compound, will produce a measureable improvement in gas rating. A major "degassing" effect can be obtained by the incorporation of 2.5% to 5% (of formamide). Higher percentages, in the range of 5% to 10%, show a further but progressively decreasing degree of improvement over the ratings obtained with the 2.5% to 5% level.

Although we describe our invention with regard to the improvement of urea-formaldehyde resin systems it would appear that the inclusion of our novel additive in various other resin systems would also be quite feasible. For example, addition of a small quantity as noted above of formamide for example to a conventional aminotriazine aldehyde resin system, such as melamine formaldehyde and the like would fall within the general scope of our concept.

It is extremely important that the "degassing" agent conform in structure to the general formula:

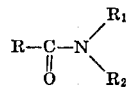

Since, unsatisfactory results are obtained when benzamide

stearamide

chloracetamide

or malonamide

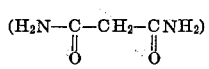

are used, i.e., the improvement in gas rating given by modifier compounds of the invention is not obtained with these materials. Similarly unsatisfactory results are obtained with phenylacetamide

and succindiamide

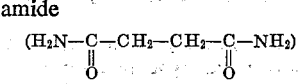

Also, when formamide is separately reacted with formaldehyde to yield a methylol derivative, and the resulting methylol formamide,

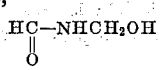

is incorporated in the composition by ball milling, good results are obtained. However, when formamide is reacted with formaldehyde under appropriate conditions to yield a different product, methylene bis-formamide

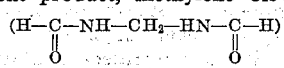

the methylene bis-formamide fails to produce a degassing effect when incorporated in the urea-formaldehyde composition at the ball milling stage. Again, good results are obtained with acrylamide

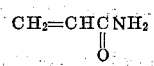

whereas methylene bis-acrylamide

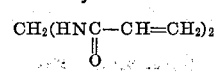

the structure of which does not conform to the general formula as previously defined gives no improvement.

It will be appreciated therefore, that compounds of the formula:

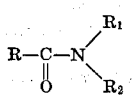

are effective in "degassing" urea-formaldehyde molding compounds. In general, it appears that the lower molecular amides are most effective, even on a molar basis, and particularly on a weight basis. For this reason, and for reasons of cost and commercial availability, the low molecular weight unsubstituted amides, particularly formamide and acetamide, are preferred. It will also be appreciated that compounds which introduce color, pH effects or other side effects are of more limited usefulness in our invention than those compounds which can be used in the delicate pastel colors in which the gas problem is most acute. For this reason, compounds which introduce color, such as cyanoacetamide, or which introduce uncontrollable acidity, such as chloracetamide are not included in the practice of our invention.

The following are illustrative embodiments of the operation of our invention. In the examples, the invention in its composition aspect is demonstrated by the novel and improved formulations which include formamide "degassing" agent at a level of 2.5% by weight, or a molecularly equivalent quantity of other "degassing" agents of the type:

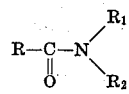

In its process aspects, the invention is demonstrated by application to several conventional urea-formaldehyde molding compound systems, benzoguanamine-formaldehyde, acetoguanamine-formaldehyde and other aminotriazine-formaldehyde molding compositions, or combinations thereof. Our discovery is likewise applicable to thermosetting resin reaction products which are to be fabricated under pressure and heat into laminates or adhesives.

In the following examples, it must be understood that the quantities of materials are in parts by weight and are intended to be merely illustrative of the inventive concept which underlies the invention. Other examples, quantitative relationships and applications will be immediately apparent to those skilled in the art.

EXAMPLE 1

Charge 600 parts of urea (10 moles), 910 parts of formalin (13.3 moles), and 2.66 parts of hexamethylenetetramine to a suitable vessel equipped with agitator. React at 100° F. until the free formaldehyde content of the syrup, as measured by one or more of the standard tests used in the industry, reaches about 8.8 to 9.4 percent. At this point, mix this syrup with 333 parts of a purified alpha-cellulose and adjust the pH of the mixture to about 6.0 with formic acid. Dry this mixture at about 185° F. until the free water content of the "unground" reaches 1.0 to 1.5 percent.

Place 3000 parts of unground prepared as above in a ball mill. Add 8.4 parts of tetrachlorophthalic anhydride, 7.8 parts of hexamethylenetetramine, 10.5 parts of titanium dioxide, and 12 parts of zinc stearate and grind for 4 hours. Add 75 parts of formamide and continue the ball mill grind for an additional 12 hours. When molded at 300° F. on a closure of about 50 mm. diameter, molding time was reduced from 80 seconds for the unmodified material to 45 seconds for the degassed formulation for equivalent appearance.

EXAMPLE 2

Charge 600 parts of urea (10 moles), 910 parts of 44% formalin (13.3 moles), and 2.66 parts of hexamethylenetetramine to a suitable vessel equipped with agitator. React at 100° F. until the free formaldehyde content of the syrup reaches 8.8 to 9.4 percent. At this point mix into the resin syrup 33.3 parts of formamide and then add 333 parts of a purified alpha-cellulose and adjust the pH of the mixture to about 6.0 with formic acid. Dry this mixture at about 185° F. until the free water content reaches about 2 to 3 percent.

Place 3,000 parts of unground prepared as above into a ball mill. Add 8.4 parts of tetrachlorophthalic anhydride, nium dioxide, and 12 parts of zinc stearate and grind for 16 hours. When molded at 300° F. on a closure of about 50 mm. diameter, molding time was reduced from greater than 75 seconds for an unmodified material to 45 seconds for the degassed formulation for equivalent appearance.

EXAMPLE 3

Charge 600 parts of urea (10 moles), 1,480 parts of 44 percent formalin (15 moles), and 2.66 parts of hexamethylenetetramine to a suitable vessel equipped with an agitator. React at 115° F. until the free formaldehyde content of the syrup reaches 8.8 to 9.4 percent. Adjust the pH to about 6.0 with 0.25 cc. of 85% lactic acid and approximately 0.5 cc. of 45 percent formic acid. Mix this resin syrup with 333 parts of a purified alpha-cellulose and dry this mixture at about 195° F. until the free water content is reduced to about 1 percent.

Charge 3,000 parts of unground prepared as above to a ball mill. Add 9.6 parts of tetrachlorophthalic anhydride, 7.8 parts of hexamethylenetetramine, 10.5 parts of titanium dioxide, and 12 parts of zinc stearate. Grind the mill for 4 hours. Add 75 parts of formamide and continue the ball mill grind for an additional 12 hours. When molded on a 28 mm. reverse taper closure which was being molded in 60 seconds with the unmodified formulation, the degassed formulation molded in 36 seconds to the same appearance.

EXAMPLE 4

Charge 600 parts of urea (10 moles), 910 parts of 44% formalin (13.3 moles), and sufficient triethylamine to set the pH of the mixture to about 10 to a reaction vessel and agitate at 80° F. until the free formaldehyde is reduced to about 5%. Mix this resin syrup into 540 parts of purified alpha-cellulose and dry at 180° F. until the free water content is reduced to about 1 percent.

Place 3,000 parts of unground prepared as above in a ball mill. Add 8.4 parts of tetrachlorophthalic anhydride, 7.8 parts of hexamethylenetetramine, 10.5 parts of titanium dioxide and 12 parts of zinc stearate and grind for 4 hours. Add 75 parts of formamide and continue the ball mill grind for an additional 12 hours. This material molded in 45 seconds to the same appearance as an unmodified formulation which was molded for 85 seconds.

EXAMPLE 5

Unground prepared as in Example 3, was ball milled in the same fashion and with the same additives as the material of Example 3, except that the formamide was omitted. In its place the following were incorporated in a quantity equivalent to 2.5% formamide by weight:

(a) Control—no modifier
(b) Acetamide
(c) Methylol formamide
(d) Dimethyl formamide
(e) Dimethyl acetamide
(f) Propionamide
(g) Acrylamide
(h) N-hydroxyethyl formamide
(i) N-hydroxyethyl acetamide
(j) Valeramide
(k) Succinamide
(l) Succinimide The cure times to obtain gas-free parts of acceptable appearance on a 55 mm. closure mold, under the same temperature and pressure conditions, were as follows:

(a) 85 seconds
(b) 60 seconds
(c) 45 seconds
(d) 60 seconds
(e) 45 seconds
(f) 65 seconds
(g) 50 seconds
(h) 80 seconds
(i) — seconds
(j) 70 seconds
(k) 80 seconds
(l) 80 seconds

EXAMPLE 6

The product of Example 3 was allowed to age in a closed container at room temperature for two months. On retesting, the flow was found to be unimpaired, and the same excellent freedom from gas was again observed.

We claim:

1. An improved molding composition comprising a dry fusible urea-formaldehyde reaction product, a filler therefor, and from 1.5 to 10 percent by weight of a compound of the formula:

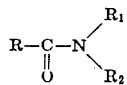

wherein R represents a substituent selected from the group consisting of lower alkyl, hydrogen and lower alkenyl; $R_1$ and $R_2$ each represent a substituent selected from the group consisting of lower alkyl, hydrogen and hydroxy lower alkyl.

2. An improved molding composition comprising a dry fusible urea-formaldehyde reaction product, a cellulosic carrier and from 1.5 to 10 percent by weight of formamide.

3. An improved molding composition comprising a dry fusible urea-formaldehyde reaction product, a cellulosic filler and from 1.5 to 10 percent by weight of acetamide.

4. An improved molding composition comprising a dry fusible urea-formaldehyde reaction product, a filler therefor, and from 2.5 to 5 percent by weight of a compound of the formula:

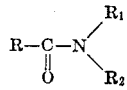

wherein R represents a substituent selected from the group consisting of lower alkyl, hydrogen and lower alkenyl; $R_1$ and $R_2$ each represent a substituent selected from the group consisting of lower alkyl, hydrogen and hydroxy lower alkyl.

5. An improved molding composition comprising a dry fusible urea-formaldehyde reaction product, a cellulosic filler therefor, and from 2.5 to 5.0 percent by weight of formamide.

6. An improved molding composition comprising a dry fusible urea-formaldehyde reaction product, a cellulosic filler therefor, and from 2.5 to 5.0 percent by weight of acetamide.

References Cited

UNITED STATES PATENTS

| | | | |
|---|---|---|---|
| 2,328,425 | 8/1943 | D'Alelio | 260—17.3 |
| 2,436,363 | 2/1948 | Marvel | 260—17.3 |
| 2,873,260 | 2/1959 | Corwin | 260—17.3 |
| 3,081,277 | 3/1963 | Wohnsiedler et al. | 260—17.3 |

WILLIAM H. SHORT, *Primary Examiner.*

E. M. WOODBERRY, *Assistant Examiner.*

UNITED STATES PATENT OFFICE
CERTIFICATE OF CORRECTION

Patent No. 3,407,154                        October 22, 1968

George Sims Casebolt et al.

It is certified that error appears in the above identified patent and that said Letters Patent are hereby corrected as shown below:

Column 5, lines 13 to 15, the formula should appear as shown below:

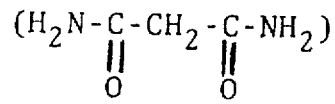

Column 6, line 61, after "anhydride," insert -- 7.8 parts of hexamethylenetetramine, --; line 62, "nium" should read -- 10.5 parts of titanium --.

Signed and sealed this 3rd day of March 1970.

(SEAL)
Attest:

EDWARD M. FLETCHER, JR.
Attesting Officer

WILLIAM E. SCHUYLER, JR.
Commissioner of Patents